(12) United States Patent
Miyata et al.

(10) Patent No.: US 11,421,700 B2
(45) Date of Patent: Aug. 23, 2022

(54) ROTARY MACHINE

(71) Applicant: MITSUBISHI HEAVY INDUSTRIES COMPRESSOR CORPORATION, Tokyo (JP)

(72) Inventors: Hiroyuki Miyata, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 17/160,554

(22) Filed: Jan. 28, 2021

(65) Prior Publication Data

US 2021/0262482 A1 Aug. 26, 2021

(30) Foreign Application Priority Data

Feb. 21, 2020 (JP) .............................. JP2020-028006

(51) Int. Cl.
*F04D 29/10* (2006.01)
*F04D 25/06* (2006.01)
*F04D 29/053* (2006.01)

(52) U.S. Cl.
CPC ........... *F04D 29/104* (2013.01); *F04D 25/06* (2013.01); *F04D 29/053* (2013.01)

(58) Field of Classification Search
CPC ...... F04D 29/104; F04D 25/06; F04D 29/053; F04D 25/028; F04D 29/063; F04D 25/0606; F16H 2200/2005; F16H 2200/2007; F16H 3/724; F16H 57/029; H02K 5/1732; H02K 21/14; H02K 5/124; H02K 7/003; H02K 7/116; H02K 16/00; Y02E 10/72; F16J 15/3484

See application file for complete search history.

(56) References Cited

U.S. PATENT DOCUMENTS

2017/0335966 A1 11/2017 Werdecker et al.
2018/0187778 A1* 7/2018 Okamoto ................ F16H 3/728

FOREIGN PATENT DOCUMENTS

| EP | 3715240 A1 | 9/2020 | |
|---|---|---|---|
| JP | 6513809 B2 | 5/2019 | |
| WO | 2019-097816 A1 | 5/2019 | |
| WO | WO-2019097816 A1 * | 5/2019 | ........... B63H 23/321 |

\* cited by examiner

*Primary Examiner* — Jacob M Amick
*Assistant Examiner* — Charles J Brauch
(74) *Attorney, Agent, or Firm* — Osha Bergman Watanabe & Burton LLP (57) ABSTRACT

A rotary machine includes a plurality of shafts that extend in an axial direction, in which an axis extends, around the axis, are disposed such that at least parts of positions in the axial direction of the plurality of shafts overlap each other, and are rotatable relative to each other around the axis; a plurality of seal members that are disposed at intervals in the axial direction to seal gaps between the plurality of shafts in a radial direction with respect to the axis; and a seal gas supply unit configured to supply a seal gas from outside to a space surrounded by the plurality of shafts and the plurality of seal members.

4 Claims, 3 Drawing Sheets

ROTARY MACHINE

BACKGROUND OF THE INVENTION

Field of the Invention

The present disclosure relates to a rotary machine.

Priority is claimed on Japanese Patent Application No. 2020-028006, filed Feb. 21, 2020, the content of which is incorporated herein by reference.

Description of Related Art

Japanese Patent Publication No. 6513809 discloses a shaft seal device that includes a plurality of seals along an axial direction of a rotary shaft and pressurizes a space between the seals to provide a seal between one side (product side) and the other side (atmosphere side) in the axial direction.

SUMMARY OF THE INVENTION

By the way, in a structure where another shaft is disposed to be inserted into a shaft having a hollow cylindrical shape and a plurality of the shafts rotate relative to each other, a lubricant or the like which has leaked from a bearing may infiltrate into a gap between the shaft on the outer side and the shaft on the inner side. When the lubricant adheres to the shaft on the outer side or the shaft on the inner side, the rotational balance of a shaft may deteriorate or the natural frequency of a system including the shaft and the lubricant may change, thus leading to an increase in shaft vibration. However, the current situation is that there is provided no means for effectively suppressing the intrusion of the lubricant into the gap between the shaft on the outer side and the shaft on the inner side in the structure where another shaft is disposed in the shaft which is hollow.

The present disclosure provides a rotary machine that can suppress intrusion of a lubricant or the like into a gap between a plurality of shafts to suppress an increase in shaft vibration.

According to the present disclosure, there is provided a rotary machine including: a plurality of shafts that extend in an axial direction, in which an axis extends, around the axis, are disposed such that at least parts of positions in the axial direction of the plurality of shafts overlap each other, and are rotatable relative to each other around the axis; a plurality of seal members that are disposed at intervals in the axial direction to seal gaps between the plurality of shafts in a radial direction with respect to the axis; and a seal gas supply unit configured to supply a seal gas from outside to a space surrounded by the plurality of shafts and the plurality of seal members.

According to the rotary machine of the present disclosure, a lubricant or the like is suppressed from infiltrating into the gap between the plurality of shafts, so that an increase in shaft vibration can be suppressed.

DETAILED DESCRIPTION OF THE INVENTION

Hereinafter, a mode for carrying out a rotary machine according to the present disclosure will be described with reference to the accompanying drawings. However, the present disclosure is not limited to only the embodiment.

(Overall Configuration of Rotary Machine)

Figure 1:
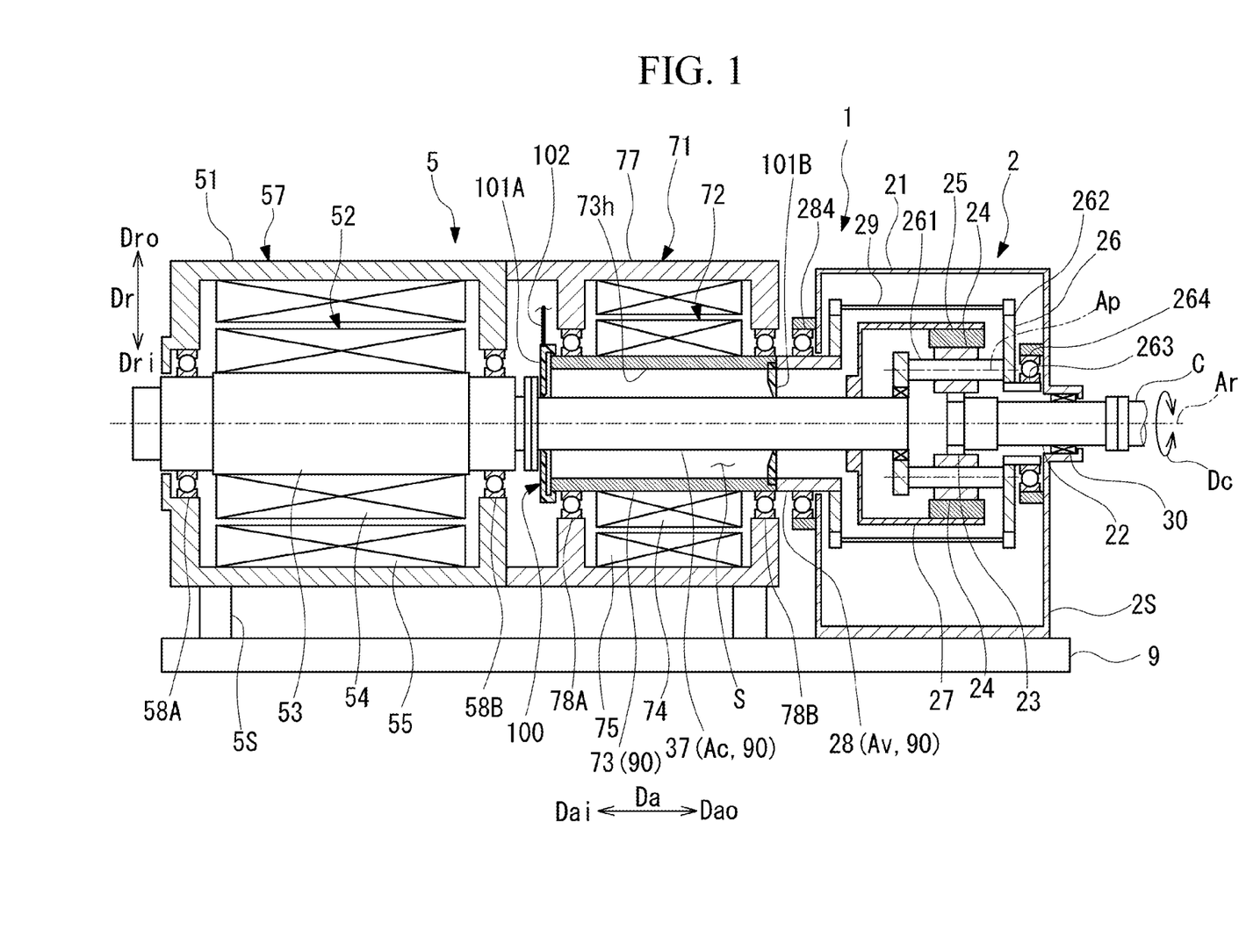
FIG. 1 is a cross-sectional view illustrating a schematic configuration of a rotary machine according to the present embodiment.

A rotary machine 1 includes a plurality (two in the present embodiment) of shafts 90 which are disposed such that at least parts of the positions in an axial direction Da of the plurality of shafts 90 overlap each other, and are coaxially rotatable relative to each other, and a shaft seal unit 100 which seals a gap between the plurality of shafts 90. As illustrated in FIG. 1, in the present embodiment, the rotary machine 1 is a variable speed accelerator. The rotary machine 1 includes an electric device 5 and a transmission device 2.

The electric device 5 generates a rotational driving force. The transmission device 2 shifts the rotational driving force, which is generated by the electric device 5, to transfer the shifted rotational driving force to a drive target. The rotary machine 1 is applicable to, for example, a fluid machine system such as a compressor system. The drive target of the rotary machine 1 of the present embodiment is a compressor C.

(Configuration of Electric Device)

The electric device 5 is supported on an electric device support portion 5S on a stand 9. The electric device 5 includes a constant speed electric motor 51 and a variable speed electric motor 71. The constant speed electric motor 51 includes a constant speed rotor 52 that rotates around an axis Ar at a constant speed. The variable speed electric motor 71 includes a variable speed rotor 72 that rotates around the axis Ar at a random rotation speed. The constant speed rotor 52 and the variable speed rotor 72 each are connected to the transmission device 2.

Hereinafter, a direction in which the axis Ar extends is referred to as the axial direction Da, one side in the axial direction Da is referred to as an output side Dao, and the other side in the axial direction Da opposite the output side is referred to as an input side Dai. In addition, a radial direction centered around the axis Ar is simply referred to as a radial direction Dr. In the rotary machine 1 of the present embodiment, the electric device 5 is disposed on the input side Dai in the axial direction Da, and the transmission device 2 is disposed on the output side Dao of the electric device 5. The compressor C is disposed on the output side Dao of the rotary machine 1.

(Configuration of Constant Speed Electric Motor)

The constant speed electric motor 51 drives an internal gear carrier shaft (second shaft) 37 of the transmission device 2 to rotate at a constant speed, the internal gear carrier shaft being a constant speed input shaft Ac. The constant speed electric motor 51 includes the constant speed rotor 52, a constant speed stator 55, and a constant speed electric motor casing 57.

The constant speed rotor 52 includes a constant speed rotor shaft 53 and a conductor 54. The constant speed rotor shaft 53 has a columnar shape centered around the axis Ar and extending in the axial direction Da. The internal gear carrier shaft 37 of the transmission device 2 is connected to an end portion on the output side Dao of the constant speed rotor shaft 53, the internal gear carrier shaft 37 being the constant speed input shaft Ac. The conductor 54 is fixed to an outer periphery of the constant speed rotor shaft 53.

The constant speed stator 55 is disposed on an outer side Dro in the radial direction Dr with respect to the conductor 54 of the constant speed rotor 52. The constant speed stator 55 is formed of a plurality of coils.

The constant speed electric motor casing 57 has a cylindrical shape centered around the axis Ar and extending in the axial direction Da. The constant speed stator 55 is fixed to an inner peripheral surface of the constant speed electric motor casing 57. Constant speed rotor bearings 58A and 58B are disposed at an interval in the axial direction Da on the input side Dai and the output side Dao in the axial direction Da of the constant speed electric motor casing 57. The constant speed rotor shaft 53 is supported on the constant speed rotor bearings 58A and 58B so as to be rotatable around the axis Ar.

(Configuration of Variable Speed Electric Motor)

The variable speed electric motor 71 drives an input side planetary gear carrier shaft (first shaft) 28 of the transmission device 2 to rotate at a random rotation speed, the input side planetary gear carrier shaft 28 being a variable speed input shaft Av. The variable speed electric motor 71 includes the variable speed rotor 72, a variable speed stator 75, and a variable speed electric motor casing 77.

The variable speed rotor 72 includes a variable speed rotor shaft 73 and a conductor 74. The variable speed rotor shaft 73 has a hollow cylindrical shape (cylindrical shape) with respect to the axis Ar, which extends in the axial direction Da, and has a shaft insertion hole 73h penetrating through the variable speed rotor shaft 73 in the axial direction Da. The internal gear carrier shaft 37 which is the constant speed input shaft Ac is inserted into the shaft insertion hole 73h of the variable speed rotor shaft 73. The input side planetary gear carrier shaft 28 which is the variable speed input shaft Av is connected to an end portion on the output side Dao of the variable speed rotor shaft 73. The conductor 74 is fixed to an outer periphery of the variable speed rotor shaft 73.

The variable speed stator 75 is disposed on the outer side Dro in the radial direction Dr with respect to the conductor 74. The variable speed stator 75 is formed of a plurality of coils.

The variable speed electric motor casing 77 has a cylindrical shape centered around the axis Ar and extending in the axial direction Da, and the variable speed stator 75 is fixed to an inner peripheral side of the variable speed electric motor casing 77. Variable speed rotor bearings 78A and 78B are disposed at an interval in the axial direction Da on an inner side Dri in the radial direction Dr of the variable speed electric motor casing 77. The variable speed rotor shaft 73 is supported on the variable speed rotor bearings 78A and 78B so as to be rotatable around the axis Ar.

(Configuration of Transmission Device)

The transmission device 2 is a planetary gear transmission device including a plurality of gears. The transmission device 2 is supported on a transmission device support portion 2S on the stand 9. The transmission device 2 includes a transmission casing 21, a sun gear shaft 22, a sun gear 23, a plurality of planetary gears 24, an internal gear 25, a planetary gear carrier 26, an internal gear carrier 27, the input side planetary gear carrier shaft 28, and a transfer shaft 29.

The transmission casing 21 covers the sun gear shaft 22, the sun gear 23, the plurality of planetary gears 24, the internal gear 25, the planetary gear carrier 26, the internal gear carrier 27, the input side planetary gear carrier shaft 28, and the transfer shaft 29.

The sun gear shaft 22 has a columnar shape centered around the axis Ar and extending in the axial direction Da. The sun gear shaft 22 is supported on the transmission casing 21 via a sun gear bearing 30 so as to be rotatable around the axis Ar. An end portion on the output side Dao in the axial direction Da of the sun gear shaft 22 protrudes from the transmission casing 21 to the output side Dao. For example, a rotor of the compressor C as a drive target is connected to the end portion on the output side Dao of the sun gear shaft 22.

The sun gear 23 is fixed to an end portion on the input side Dai in the axial direction Da of the sun gear shaft 22. The sun gear 23 is provided to be rotatable, integrally with the sun gear shaft 22, around the axis Ar extending in a horizontal direction.

The plurality of planetary gears 24 are disposed on the outer side Dro in the radial direction Dr with respect to the sun gear 23. The plurality of planetary gears 24 are disposed apart from each other in a circumferential direction Dc around the axis Ar. The plurality of planetary gears 24 mesh with the sun gear 23 to revolve around the axis Ar and to rotate around center axes Ap thereof.

The internal gear 25 is disposed on the outer side Dro in the radial direction Dr with respect to the plurality of planetary gears 24. The internal gear 25 is formed in an annular shape centered around the axis Ar. The internal gear 25 includes a plurality of teeth on the inner side Dri in the radial direction Dr, the plurality of teeth meshing with the plurality of planetary gears 24.

The plurality of planetary gears 24 are supported on the planetary gear carrier 26 so as to be revolvable around the axis Ar and to be rotatable around the center axes Ap of the planetary gears 24. The planetary gear carrier 26 includes a planetary gear shaft 261, a planetary gear carrier body 262, and an output side planetary gear carrier shaft 263.

The planetary gear shaft 261 is provided for each of the plurality of planetary gears 24. The planetary gear 24 is supported on the planetary gear shaft 261 so as to be rotatable around the center axis Ap.

The planetary gear carrier body 262 is formed in a disk shape extending from a plurality of the planetary gear shafts 261 to the outer side Dro in the radial direction Dr. A central portion of the planetary gear carrier body 262 is provided with an opening that penetrates through the planetary gear carrier body 262 in the axial direction Da. The planetary gear carrier body 262 supports the plurality of planetary gear shafts 261, and fixes the positions of the plurality of planetary gear shafts 261 with respect to each other.

The output side planetary gear carrier shaft 263 is fixed to the opening formed in the central portion of the planetary gear carrier body 262. The output side planetary gear carrier shaft 263 has a cylindrical shape centered around the axis Ar and extending in the axial direction Da. The output side planetary gear carrier shaft 263 extends from the planetary gear carrier body 262 to the output side Dao in the axial direction Da. The output side planetary gear carrier shaft 263 is supported on the transmission casing 21 via an output side planetary gear carrier bearing 264 so as to be rotatable around the axis Ar.

The input side planetary gear carrier shaft 28 is one of the plurality of shafts 90 in the present embodiment, and is the shaft 90 that is disposed on the outer side in the radial direction Dr among the plurality of shafts 90. The input side planetary gear carrier shaft 28 has a hollow cylindrical shape (cylindrical shape) with respect to the axis Ar, which extends in the axial direction Da. The input side planetary gear carrier shaft 28 is disposed on the input side Dai in the axial direction Da of the transmission device 2. The input side planetary gear carrier shaft 28 is supported on the transmission casing 21 via an input side planetary gear carrier bearing 284 so as to be rotatable around the axis Ar. The input side planetary gear carrier shaft 28 protrudes from the transmission casing 21 to the input side Dai in the axial direction Da. An end portion on the input side Dai of the input side planetary gear carrier shaft 28 is connected to the variable speed rotor shaft 73. The input side planetary gear carrier shaft 28 is fixed to the variable speed rotor shaft 73 so as to rotate integrally with the variable speed rotor shaft 73. Namely, the input side planetary gear carrier shaft 28, together with the variable speed rotor shaft 73, is formed as one rotary shaft. As a result, the input side planetary gear carrier shaft 28, together with the variable speed rotor shaft 73, forms one of the plurality of shafts 90 in the present embodiment. The input side planetary gear carrier shaft 28 and the variable speed rotor shaft 73 are the shaft 90 that is disposed on the outer side in the radial direction Dr among the plurality of shafts 90. The input side planetary gear carrier shaft 28 is the variable speed input shaft Av that is rotated at a random rotation speed by the driving force of the variable speed electric motor 71. The rotary machine 1 can change the rotation speed of the variable speed electric motor 71 to change the rotation speed of the sun gear shaft 22 which is an output shaft Ao of the transmission device 2 connected to the drive target.

The transfer shaft 29 transfers rotation of the input side planetary gear carrier shaft 28 to the planetary gear carrier 26. The transfer shaft 29 extends in the axial direction Da, and is supported to be rotatable around a center axis thereof. The transfer shaft 29 is fixed to the transmission casing 21 via a bearing (not illustrated). An end portion on the input side Dai of the transfer shaft 29 meshes with a gear (not illustrated) installed between the input side planetary gear carrier shaft 28 and the transfer shaft 29. An end portion on the output side Dao of the input side transfer shaft 29 meshes with a gear formed on an outer periphery of the planetary gear carrier body 262. Accordingly, the rotation of the input side planetary gear carrier shaft 28 is transferred to the planetary gear carrier 26 via the transfer shaft 29.

The internal gear 25 is supported on the internal gear carrier 27 so as to be rotatable around the axis Ar. The internal gear carrier 27 has a cylindrical shape with respect to the axis Ar. The internal gear 25 is fixed to the inner side Dri in the radial direction Dr of the internal gear carrier 27. An end portion on the input side Dai in the axial direction Da of the internal gear carrier 27 is fixed to the internal gear carrier shaft 37.

The internal gear carrier shaft 37 is one of the plurality of shafts 90 in the present embodiment, and is the shaft 90 that is disposed on the inner side in the radial direction Dr among the plurality of shafts 90. The internal gear carrier shaft 37 has a columnar shape centered around the axis Ar and extending in the axial direction Da. The internal gear carrier shaft 37 is disposed on the input side Dai in the axial direction Da with respect to the sun gear shaft 22. The internal gear carrier shaft 37 is inserted into an inner peripheral side of the input side planetary gear carrier shaft 28 and the variable speed rotor shaft 73. Therefore, the internal gear carrier shaft 37 is disposed such that at least a part of the position in the axial direction Da of the internal gear carrier shaft 37 overlaps the input side planetary gear carrier shaft 28 and the variable speed rotor shaft 73. Specifically, the internal gear carrier shaft 37 extends in the axial direction Da inside the input side planetary gear carrier shaft 28 and the variable speed rotor shaft 73 in the radial direction Dr. The internal gear carrier shaft 37 is rotatable relative to the input side planetary gear carrier shaft 28 and the variable speed rotor shaft 73 around the axis Ar. An end portion on the input side Dai in the axial direction Da of the internal gear carrier shaft 37 is connected to the constant speed rotor shaft 53. The internal gear carrier shaft 37 drives the internal gear carrier 27. The internal gear carrier shaft 37 is the constant speed input shaft Ac that is rotated at a constant speed by the driving force of the constant speed electric motor 51.

In the rotary machine 1 with such a configuration, when electric power is supplied to the constant speed electric motor 51, the constant speed electric motor 51 rotates the constant speed rotor 52 around the axis Ar in one direction. As the constant speed rotor 52 rotates around the axis Ar, the internal gear carrier shaft 37, the internal gear carrier 27, and the internal gear 25 rotate. Accordingly, the plurality of planetary gears 24 provided on the inner side Dri in the radial direction Dr of the internal gear 25 are rotated. As a result, the output shaft Ao is driven to rotate around the axis Ar.

(Configuration of Shaft Seal Unit)

Figure 2:
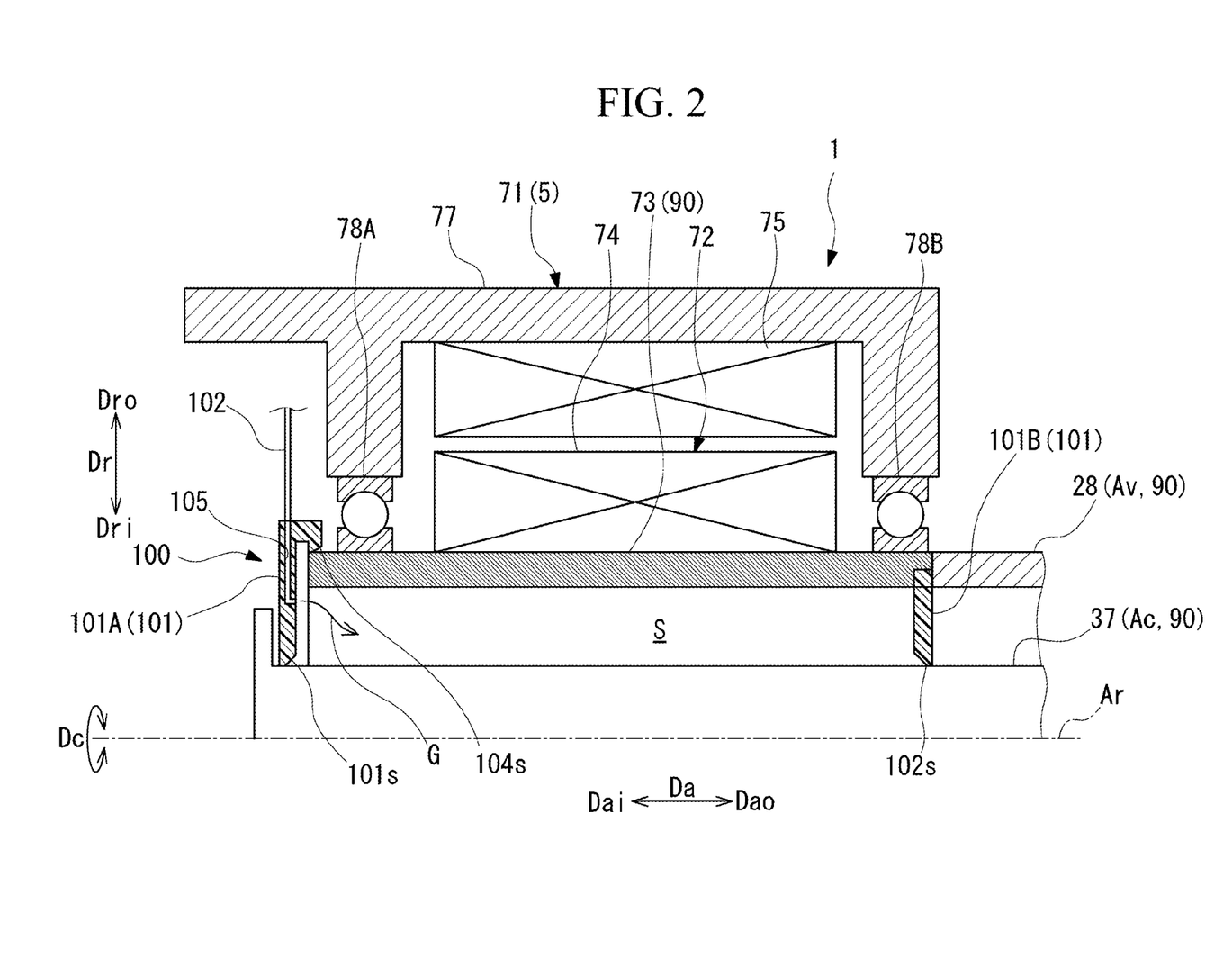
FIG. 2 is an enlarged cross-sectional view illustrating a seal structure of a first shaft having a hollow cylindrical shape and a second shaft provided on an inner side in a radial direction of the first shaft in the rotary machine.

As illustrated in FIG. 2, the shaft seal unit 100 seals a space S between the input side planetary gear carrier shaft 28 and the variable speed rotor shaft 73 that have a hollow cylindrical shape and the internal gear carrier shaft 37 disposed on the inner side Dri in the radial direction Dr thereof. The shaft seal unit 100 includes a plurality of seal members 101 and a seal gas supply unit 102.

(Configuration of Seal Member)

The plurality of seal members 101 seal gaps between the plurality of shafts 90 in the radial direction Dr. The seal members 101 of the present embodiment seal gaps between the variable speed rotor shaft 73 and the internal gear carrier shaft 37. The plurality of seal members 101 are disposed at intervals in the axial direction Da. The rotary machine 1 of the present embodiment includes a first seal member 101A and a second seal member 101B as the seal members 101.

The first seal member 101A is disposed on an end portion on the input side Dai in the axial direction Da of the variable speed rotor shaft 73 having a hollow cylindrical shape. The first seal member 101A is fixed to the variable speed electric motor casing 77. Namely, the first seal member 101A is disposed in a non-rotating state. The first seal member 101A has an annular shape extending in the circumferential direction Dc when seen in the axial direction Da. The first seal member 101A is formed to cover the end portion of the variable speed rotor shaft 73 in a state where the internal gear carrier shaft 37 is inserted into the first seal member 101A. The first seal member 101A provides a seal between the variable speed rotor shaft 73 and the internal gear carrier shaft 37. Specifically, the first seal member 101A includes an outer peripheral seal end 104s in an end portion on the outer side in the radial direction Dr, the outer peripheral seal end 104s sealing between an outer peripheral surface of the variable speed rotor shaft 73 and the first seal member 101A. In addition, the first seal member 101A includes an inner peripheral seal end 101s in an end portion on the inner side in the radial direction Dr (end portion opposite the outer peripheral seal end 104s), the inner peripheral seal end 101s sealing between an inner peripheral surface of the internal gear carrier shaft 37 and the first seal member 101A. The first seal member 101A is a non-contact seal member, for example, a labyrinth seal. Therefore, the outer peripheral seal end 104s is disposed at a position where a very small clearance is formed with respect to the outer peripheral surface of the variable speed rotor shaft 73. Similarly, the inner peripheral seal end 101s is disposed at a position where a very small clearance is formed with respect to the inner peripheral surface of the internal gear carrier shaft 37.

The second seal member 101B is disposed in the end portion on the output side Dao in the axial direction Da of the variable speed rotor shaft 73 having a hollow cylindrical shape. Namely, the first seal member 101A is disposed close to a connecting portion between the variable speed rotor shaft 73 and the input side planetary gear carrier shaft 28. The second seal member 101B has an annular shape extending in the circumferential direction Dc when seen in the axial direction Da. The second seal member 101B is formed to be in contact with an inner peripheral surface of the variable speed rotor shaft 73 in a state where the internal gear carrier shaft 37 is inserted into the second seal member 101B. An end portion on the outer side in the radial direction Dr of the second seal member 101B is fixed to the variable speed rotor shaft 73. The second seal member 101B includes an inner peripheral seal end 102s in an end portion on the inner side in the radial direction Dr, the inner peripheral seal end 102s sealing between the inner peripheral surface of the internal gear carrier shaft 37 and the second seal member 101B. The second seal member 101B is a non-contact seal member, for example, a labyrinth seal. Therefore, the inner peripheral seal end 102s is disposed at a position where a very small clearance is formed with respect to the inner peripheral surface of the internal gear carrier shaft 37.

The seal gas supply unit 102 supplies a seal gas G from outside to the space S surrounded by the inner peripheral surface of the variable speed rotor shaft 73, the outer peripheral surface of the internal gear carrier shaft 37, the first seal member 101A, and the second seal member 101B. The seal gas supply unit 102 supplies an inert gas such as air, nitrogen, or argon to the space S from a seal gas supply source (not illustrated) provided outside. For this reason, a flow path portion 105 through which the seal gas G is supplied into the space S from outside is formed in at least one of a plurality of the first seal member 101A and the second seal member 101B. In the present embodiment, the flow path portion 105 is formed in the first seal member 101A. The flow path portion 105 penetrates through the first seal member 101A to allow the space S and the outside of the first seal member 101A to communicate with each other. The seal gas supplied flows through the flow path portion 105. The seal gas supply unit 102 supplies the seal gas G into the space S, the seal gas G having a pressure higher than that outside the space S. Accordingly, the shaft seal unit 100 of the present embodiment functions as a seal that does not use a lubricant.

According to the rotary machine 1 as described above, the plurality of first seal member 101A and second seal member 101B provide a seal between the variable speed rotor shaft 73 and the internal gear carrier shaft 37, and the seal gas supply unit 102 supplies the seal gas G to the space S. For this reason, the pressure of the space S is higher than that outside the variable speed rotor shaft 73, so that the lubricant or the like is suppressed from infiltrating into the space S from outside the space S. Namely, the lubricant used in the variable speed rotor bearings 78A and 78B is suppressed from infiltrating into the gap between the variable speed rotor shaft 73 and the internal gear carrier shaft 37. As a result, the lubricant is suppressed from adhering to the inner peripheral surface of the variable speed rotor shaft 73 or the outer peripheral surface of the internal gear carrier shaft 37, so that an increase in shaft vibration can be suppressed.

In addition, the first seal member 101A and the second seal member 101B are non-contact seal members. For this reason, when sealing is made between the variable speed rotor shaft 73 and the internal gear carrier shaft 37, the use of the lubricant is not required. Therefore, no lubricant used for sealing infiltrates into the gap between the variable speed rotor shaft 73 and the internal gear carrier shaft 37. As a result, the lubricant can be further suppressed from adhering to the inner peripheral surface of the variable speed rotor shaft 73 or the outer peripheral surface of the internal gear carrier shaft 37.

In addition, the flow path portion 105 is formed in the first seal member 101A fixed to the variable speed electric motor casing 77. Accordingly, a flow path for the supply of the seal gas into the space S is not required to be formed at a location other than the first seal member 101A in the non-rotating state. Therefore, the flow path for the supply of the seal gas is not required to be formed in the variable speed rotor shaft 73 or the internal gear carrier shaft 37 that rotate each other. Accordingly, the flow path portion 105 can be easily formed. In addition, for example, when the first seal member 101A and the seal gas supply unit 102 are additionally provided, the shaft seal unit 100 can be easily added to the rotary machine 1 that does not include the first seal member 101A portion and the seal gas supply unit 102.

Other Embodiments

As described above, the embodiment of the present disclosure has been described in detail with reference to the drawings; however, the specific configuration is not limited to the embodiment, and a design change and the like are included without departing from the concept of the present disclosure.

Incidentally, in the above embodiment, the variable speed accelerator has been provided as an example of the rotary machine 1; however, the use, configuration, and the like of the rotary machine do not matter as long as the rotary machine 1 includes the plurality of shafts 90, the plurality of seal members 101, and the seal gas supply unit 102. For example, the rotary machine may be a drive system around a propeller shaft provided in a ship or the like, a wind turbine, or the like.

In addition, in the above embodiment, a structure where two shafts 90, namely, the first shaft which is the variable speed rotor shaft 73 and the input side planetary gear carrier shaft 28 and the second shaft which is the internal gear carrier shaft 37 are provided as the plurality of shafts 90 has been described as an example; however, the plurality of shafts 90 are not limited to a double structure. The number of the plurality of shafts 90 is not limited as long as another shaft 90 is disposed inside the shaft 90 rotating. Therefore, the plurality of shafts 90 may have a triple structure or more.

In addition, in the above embodiment, the variable speed rotor shaft 73 and the input side planetary gear carrier shaft 28 are formed as the first shaft, and the internal gear carrier shaft 37 is formed as the second shaft; however, the present invention is not limited to such a configuration. For example, the variable speed rotor shaft 73 and the input side planetary gear carrier shaft 28 may be formed as the second shaft, and the internal gear carrier shaft 37 may be formed as the first shaft. Namely, a configuration where a shaft insertion hole is formed in the constant speed rotor 52 and the variable speed rotor 72 is inserted into the shaft insertion hole may be adopted.

In addition, in the above embodiment, the second seal member 101B is disposed in the end portion on the output side Dao in the axial direction Da of the variable speed rotor shaft 73; however, the present invention is not limited to such a structure. For example, the second seal member 101B may be fixed to the input side planetary gear carrier shaft 28 connected to the variable speed rotor shaft 73.

In addition, the second seal member 101B may be disposed in the non-rotating state and the first seal member 101A may be rotatably fixed to the variable speed rotor shaft 73 or the internal gear carrier shaft 37.

In addition, a configuration of a transmission device 2A is not limited to the above-described gear configuration as in the present embodiment. Specifically, gears which mesh with the planetary gears 24 and 24A may be not only the internal gear 25 as in the present embodiment but also an external gear 25A. For example, a rotary machine of a modification example will be described with reference to FIG. 3. In the modification example, the same components as those in the present embodiment are denoted by the same reference signs, and detailed description thereof will be omitted. In the modification example, the internal structure of the transmission device differs from that in the present embodiment.

Figure 3:
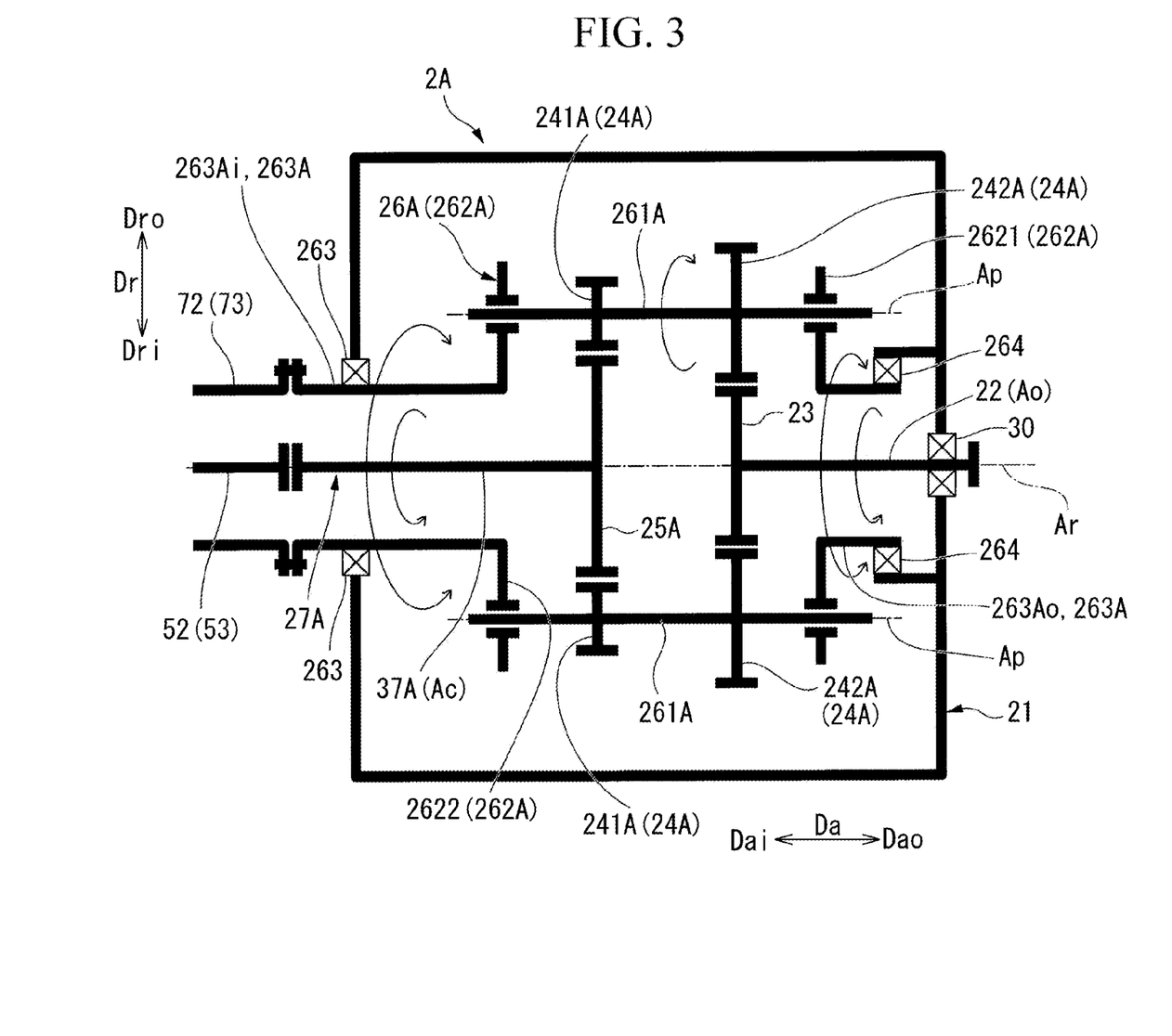
FIG. 3 is a schematic view illustrating a configuration of a transmission device of a rotary machine according to a modification example of the present disclosure.

In the transmission device 2A of the modification example, the gear which is the internal gear 25 in the present embodiment is the external gear 25A. Therefore, the gear carrier shaft which is the internal gear carrier shaft 37 in the present embodiment is an external gear carrier shaft 37A.

Specifically, the transmission device 2A of the modification example includes the sun gear 23, the sun gear shaft 22, the planetary gear 24A, the external gear (gear) 17A, a planetary gear carrier 26A, an external gear carrier (gear carrier) 31A, and the transmission casing 21 that covers the above components.

The planetary gear 24A of the modification example includes a plurality of first planetary gears (primary gears) 241A and a plurality of second planetary gears (secondary gears) 242A.

The first planetary gears 241A mesh with the external gear 25A. The first planetary gears 241A revolve around the axis Ar and rotate around the center axes Ap thereof.

The second planetary gears 242A mesh with the sun gear 23. The second planetary gears 242A revolve around the axis Ar and rotate around the center axes Ap similar to the first planetary gears 241A. The second planetary gear 242A is disposed closer to the output side Dao in the axial direction Da than the first planetary gear 241A. One of the second planetary gears 242A is rotatable integrally with one of the first planetary gears 241A. Namely, one first planetary gear 241A is disposed to be paired with one second planetary gear 242A.

The planetary gear carrier 26A of the modification example includes a planetary gear shaft 261A, a planetary gear carrier body 262A, and a planetary gear carrier shaft 263A.

The planetary gear shaft 261A is provided for each of the planetary gears 24A. The first planetary gear 241A and the second planetary gear 242A which are connected to each other centered around the center axis Ap are rotatable by the planetary gear shaft 261A. The planetary gear shaft 261A connects one second planetary gear 242A to one first planetary gear 241A. Specifically, the first planetary gear 241A is connected to the input side Dai in the axial direction Da of the planetary gear shaft 261A, and the second planetary gear 242A is connected to the output side Dao in the axial direction Da of the planetary gear shaft 261A. The planetary gear shaft 261A penetrates through the first planetary gear 241A and the second planetary gear 242A in the axial direction Da. Therefore, an end portion on the input side Dai in the axial direction Da of the planetary gear shaft 261A is located closer to the input side Dai in the axial direction Da than the first planetary gear 241A. In addition, an end portion on the output side Dao in the axial direction Da of the planetary gear shaft 261A is located closer to the output side Dao in the axial direction Da than the second planetary gear 242A.

The planetary gear carrier body 262A fixes the positions of a plurality of the planetary gear shafts 261A with respect to each other. The planetary gear carrier body 262A includes a planetary gear output side arm portion 2621 and a planetary gear input side arm portion 2622.

The planetary gear output side arm portion 2621 rotatably supports the end portions on the output side Dao in the axial direction Da of the plurality of planetary gear shafts 261A. The planetary gear input side arm portion 2622 rotatably supports the end portions on the input side Dai in the axial direction Da of the plurality of planetary gear shafts 261A. As described above, the planetary gear shafts 261A are supported via the planetary gear carrier body 262A, so that the planetary gear carrier 26A coaxially supports the first planetary gears 241A and the second planetary gears 242A.

The planetary gear carrier shaft 263A fixes the planetary gear carrier body 262A. The planetary gear carrier shaft 263A extends in the axial direction Da around the axis Ar. The planetary gear carrier shaft 263A includes an output side planetary gear carrier shaft 263Ao extending from the planetary gear output side arm portion 2621 to the output side Dao, and an input side planetary gear carrier shaft 263Ai extending from the planetary gear input side arm portion 2622 to the input side Dai. Both of the output side planetary gear carrier shaft 263Ao and the input side planetary gear carrier shaft 263Ai are formed in a cylindrical shape centered around the axis Ar.

The output side planetary gear carrier shaft 263Ao is supported on an output side planetary gear carrier bearing 264 so as to be rotatable around the axis Ar with respect to the transmission casing 21. The output side planetary gear carrier bearing 264 is disposed is closer to the output side than the planetary gear output side arm portion 2621. The sun gear shaft 22 is inserted into an inner peripheral side of the output side planetary gear carrier shaft 263Ao.

The input side planetary gear carrier shaft 263Ai is supported on a planetary gear carrier bearing 263 so as to be rotatable around the axis Ar with respect to the transmission casing 21. The planetary gear carrier bearing 263 is disposed closer to the input side than the planetary gear input side arm portion 2622. The external gear carrier shaft 37A to be described is inserted into an inner peripheral side of the input side planetary gear carrier shaft 263Ai.

The external gear 25A is supported on an external gear carrier 27A so as to be rotatable around the axis Ar. The external gear carrier 27A is fixed to an outer peripheral portion of the external gear carrier shaft 37A connected to the external gear 25A.

The external gear carrier shaft 37A is fixed to the external gear 25A and extends in the axial direction Da around the axis Ar. The external gear carrier shaft 37A is formed in a columnar shape centered around the axis Ar and extending in the axial direction Da. The external gear carrier shaft 37A extends from the external gear 25A to the input side Dai in the axial direction Da. A portion on the input side of the external gear carrier shaft 37A is inserted into the inner peripheral side of the input side planetary gear carrier shaft 263Ai having a cylindrical shape.

In the rotary machine 1 including the transmission device 2A described above, similar to the present embodiment, the lubricant is suppressed from adhering to the variable speed rotor shaft 73 or the internal gear carrier shaft 37, so that an increase in shaft vibration can be suppressed.

In addition, for example, the number of gears in the transmission device is not limited to the configuration as in the present embodiment. Therefore, for example, the gear which meshes with the planetary gears 24 may have a configuration where two or more internal gears 25 as in the present embodiment are provided. In addition, the gear that meshes with the planetary gears 24A may have a configuration where only one or three or more external gears 25A as in the modification example are provided.

APPENDIX

The rotary machine 1 described in each embodiment is comprehended, for example, as follows.

(1) The rotary machine 1 according to a first aspect includes the plurality of shafts 90 that extend in the axial direction Da, in which the axis Ar extends, around the axis Ar, are disposed such that at least parts of the positions in the axial direction Da of the plurality of shafts 90 overlap each other, and are rotatable relative to each other around the axis Ar; the plurality of seal members 101 that are disposed at intervals in the axial direction Da to seal the gaps between the plurality of shafts 90 in the radial direction Dr with respect to the axis Ar; and the seal gas supply unit 102 that can supply the seal gas G from outside to the space S surrounded by the plurality of shafts 90 and the plurality of seal members 101.

Examples of the rotary machine 1 include a variable speed accelerator, a propeller shaft, a wind turbine, and the like.

In the rotary machine 1, the plurality of seal members 101 provide a seal between the plurality of shafts 90, and the seal gas supply unit 102 supplies the seal gas G to the space S. For this reason, the pressure of the space S is higher than that outside the plurality of shafts 90, so that the lubricant or the like is suppressed from infiltrating into the space S from outside the space S. Namely, the lubricant used in the bearings which support the shafts 90 is suppressed from infiltrating into the gap between the plurality of shafts 90. As a result, the lubricant is suppressed from adhering between the plurality of shafts 90, so that an increase in shaft vibration can be suppressed.

(2) In the rotary machine 1 according to a second aspect, according to the rotary machine 1 of (1), the plurality of seal members 101 are disposed in a non-contact state with respect to the shaft 90 that is disposed on the inner side in the radial direction Dr among the plurality of shafts 90.

Accordingly, when sealing is made between the plurality of shafts 90, the use of the lubricant is not required. Therefore, no lubricant used for sealing infiltrates into the gap between the plurality of shafts 90. As a result, the lubricant can be further suppressed from adhering to the plurality of shafts 90.

(3) In the rotary machine 1 according to a third aspect, according to the rotary machine 1 of (1) or (2), at least one of the plurality of seal members 101 is fixed in a non-rotating state, and the seal gas supply unit 102 includes the flow path portion 105 which penetrates through the seal member 101 in the non-rotating state, to allow the space S and the outside of the seal member 101 to communicate with each other, and which the seal gas G configured to flow therein.

Accordingly, a flow path for the supply of the seal gas into the space S is not required to be formed at a location other than the seal member 101 that is not rotatable. Therefore, the flow path for the supply of the seal gas is not required to be formed in the plurality of shafts 90 that rotate each other. Accordingly, the flow path portion 105 can be easily formed.

(4) In the rotary machine 1 according to a fourth aspect, according to the rotary machine 1 of any one of (1) to (3), the plurality of shafts 90 include a first shaft 73 that has a hollow cylindrical shape extending in the axial direction Da, and is rotatable around the axis Ar, and a second shaft 37 that extends in the axial direction Da inside the first shaft 73 in the radial direction Dr and is rotatable relative to the first shaft 73 around the axis Ar. The plurality of seal members 101 provide a seal between the first shaft 73 and the second shaft 37.

(5) According to the rotary machine 1 of any one of (1) to (4), the rotary machine 1 according to a fifth aspect further includes the electric device 5 that is configured to generate a rotational driving force; and the transmission device 2 or 2A that is configured to shift the rotational driving force, which is transferred from the electric device 5 to the constant speed input shaft Ac and the variable speed input shaft Av, and thereby transfer the shifted rotational driving force to the drive target via the output shaft Ao. The electric device 5 includes the constant speed electric motor 51 including the constant speed rotor 52 that is configured to rotate the constant speed input shaft Ac of the transmission device 2 or 2A, and the variable speed electric motor 71 including the variable speed rotor 72 that is configured to rotate the variable speed input shaft Av of the transmission device 2 or 2A. The plurality of shafts 90 include the variable speed rotor 72 and the constant speed rotor 52.

EXPLANATION OF REFERENCES

1 Rotary machine
2, 2A Transmission device
2S Transmission device support portion
5 Electric device
5S Electric device support portion
9 Stand
21 Transmission casing
22 Sun gear shaft
23 Sun gear
24, 24A Planetary gear
25 Internal gear
25A External gear
26, 26A Planetary gear carrier
27 Internal gear carrier
27A External gear carrier
28 Input side planetary gear carrier shaft
29 Transfer shaft
30 Sun gear bearing
37 Internal gear carrier shaft (second shaft)
37A External gear carrier shaft
51 Constant speed electric motor
52 Constant speed rotor
53 Constant speed rotor shaft
54 Conductor
55 Constant speed stator
57 Constant speed electric motor casing
58A, 58B Constant speed rotor bearing
71 Variable speed electric motor 72 Variable speed rotor
73 Variable speed rotor shaft (first shaft)
73*h* Shaft insertion hole
74 Conductor
75 Variable speed stator
77 Variable speed electric motor casing
78A, 78B Variable speed rotor bearing
90 Shaft
100 Shaft seal unit
101 Seal member
101A First seal member
101B Second seal member
101*s*, 102*s* Inner peripheral seal end
102 Seal gas supply unit
104*s* Outer peripheral seal end
105 Flow path portion
241A First planetary gear
242A Second planetary gear
261, 261A Planetary gear shaft
262, 262A Planetary gear carrier body
263 Output side planetary gear carrier shaft
263A Planetary gear carrier shaft
263Ai Input side planetary gear carrier shaft
263Ao Output side planetary gear carrier shaft
264 Output side planetary gear carrier bearing
284 Input side planetary gear carrier bearing
2621 Planetary gear output side arm portion
2622 Planetary gear input side arm portion
Ac Constant speed input shaft
Ao Output shaft
Ap Center axis
Ar Axis
Av Variable speed input shaft
C Compressor
Da Axial direction
Dai Input side
Dao Output side
Dc Circumferential direction
Dr Radial direction
Dri Inner side
Dro Outer side
G Seal gas
S Space

What is claimed is:

1. A rotary machine comprising:
shafts that extend in an axial direction along an axis, wherein the shafts are:
    disposed such that at least a part of each of the shafts overlaps a part of another of the shafts in the axial direction, and
    rotatable relative to each other around the axis;
seal members that are disposed at intervals in the axial direction to seal gaps between the shafts in a radial direction with respect to the axis; and
a seal gas supply unit configured to supply a seal gas from outside to a space surrounded by the shafts and the seal members, wherein
at least one of the seal members are fixed in a non-rotating state,
the seal gas supply unit includes a flow path portion through which the seal gas flows, and
the flow path portion penetrates through the at least one seal member in the non-rotating state and allows the space surrounded by the shafts and the seal members to communicate with an outside of the at least one seal member.

2. The rotary machine according to claim 1, wherein the seal members are disposed in a non-contact state with respect to a shaft that is disposed on an inner side in the radial direction among the shafts.

3. The rotary machine according to claim 1, wherein the shafts include:
    a first shaft that has a hollow cylindrical shape extending in the axial direction, and is rotatable around the axis, and
    a second shaft that extends in the axial direction inside the first shaft in the radial direction and is rotatable relative to the first shaft around the axis, and
the seal members provide a seal between the first shaft and the second shaft.

4. The rotary machine according to claim 1, further comprising:
an electric device that is configured to generate a rotational driving force; and
a transmission device that is configured to shift the rotational driving force, which is transferred from the electric device to a constant speed input shaft and a variable speed input shaft, and thereby transfer the shifted rotational driving force to a drive target via an output shaft, wherein
the electric device includes
    a constant speed electric motor including a constant speed rotor that is configured to rotate the constant speed input shaft of the transmission device, and
    a variable speed electric motor including a variable speed rotor that is configured to rotate the variable speed input shaft of the transmission device, and
the shafts include the variable speed rotor and the constant speed rotor.

* * * * *